Dec. 14, 1948.  R. S. WARD  2,456,349
LOCKING DEVICE
Filed Dec. 22, 1945  2 Sheets-Sheet 1

INVENTOR
ROBERT S. WARD.
BY
ATTORNEY

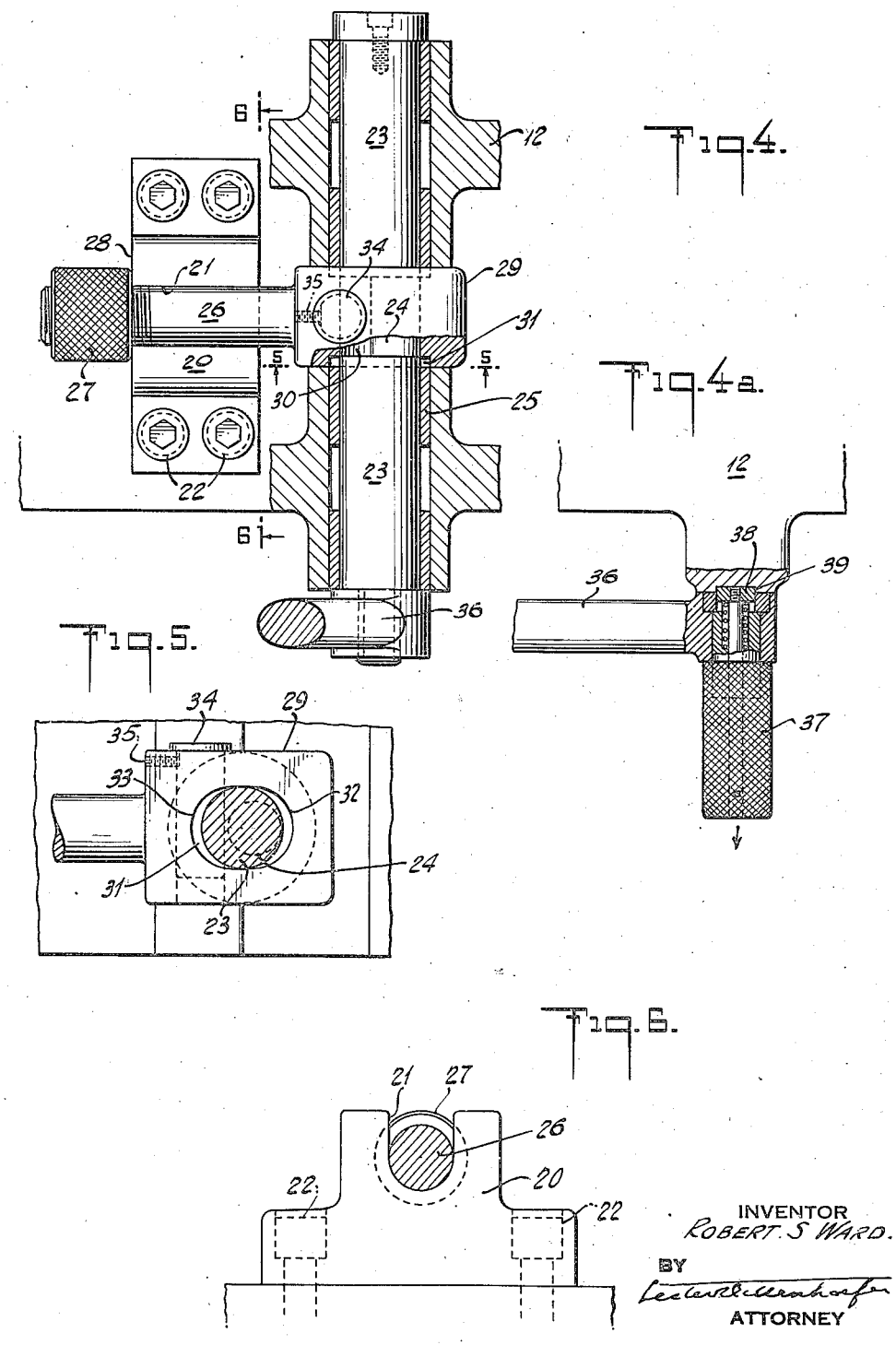

Patented Dec. 14, 1948

2,456,349

UNITED STATES PATENT OFFICE 2,456,349

LOCKING DEVICE

Robert S. Ward, Leominster, Mass., assignor to Fosgood Corporation, Leominster, Mass., a corporation of Massachusetts Application December 22, 1945, Serial No. 636,928

2 Claims. (Cl. 18—30)

This invention relates to a locking device for temporarily fastening a slidable part of an apparatus in stationary position.

The device is intended particularly for use in locking the nozzle carriage of an injection molding machine during injection of the material into the mold, although it may be used in connection with machines for other purposes.

In the injection molding of articles made of plastics, the material is forced through a nozzle into the mold by a hydraulic ram or piston under very high pressure, usually about 20,000 pounds per square inch. The nozzle is mounted on a carriage, and its tip is held against the gate of the mold during injection. With machines now in use considerable difficulty has been experienced due to the fact that under the extreme pressure built up at the point of contact of the nozzle and gate some leakage of material has occurred.

The principal objects of my invention are to provide a device that is easy and quick to operate, and whereby the nozzle of an injection molding machine will be firmly and tightly locked fast against the gate of the mold to prevent leakage of the molding material during injection.

Another object is to provide a device of novel construction for detachably securing a slidable part of an apparatus to a fixed or immovable part.

The invention will be understood from the following specification, reference being had to the accompanying drawings, in which:

Fig. 4 is a top plan view, of the device, partly in section;

Fig. 4a is a detailed view, partly in section, of the handle;

Fig. 5 is a vertical section of a part of the device on the line 5—5 of Fig. 4; and Fig. 6 is a vertical section on the line 6—6 of Fig. 4.

Figure 1:
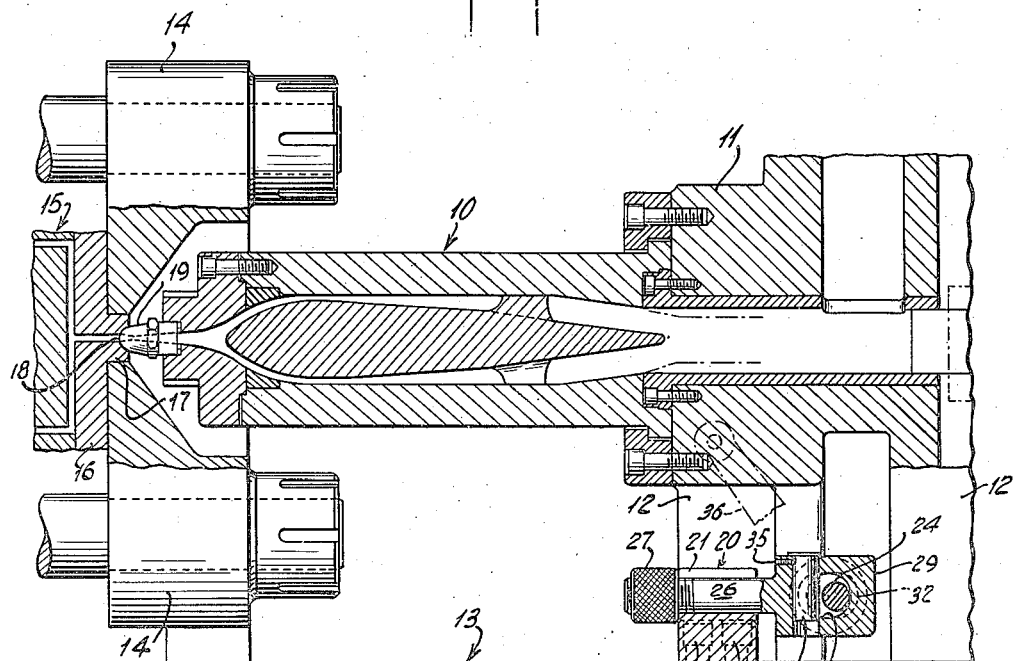
Fig. 1 is a vertical section of a part of an injection molding machine showing the locking device in locked position.

Parts of an injection molding machine of the type to which the locking device is applied, in so far as are deemed necessary for a clear understanding of the invention, are illustrated in Fig. 1 of the drawings. The nozzle, indicated generally by the reference numeral 10, is borne on a carriage 11 supported on a pedestal 12 that is mounted to slide lengthwise on the bed 13 of the machine in a suitable guideway (not shown). The carriage, in addition to the nozzle, carries other parts of the machine assembly. 14 indicates a stationary plate to which one part of the split mold 15 is detachably secured. The mold part 16 has a gate-nipple 17 that is received in an opening in plate 14. The entrance 18 to the gate is preferably complemental in shape to that of the tip 19 on the nozzle. During injection of the molding material or substance, the tip of the nozzle is held tightly against the gate-entrance. One reason for mounting the nozzle on a sliding carriage is to make it readily accessible for cleaning, repair, replacement, etc.

The locking device, with which this invention is particularly concerned, consists essentially of two members, to wit, a fixed member fastened to the bed of the machine and a locking member secured to the carriage to slide therewith.

The fixed member consists of a saddle block 20 having a depression 21 in its upper surface, which block is secured to the bed by bolts 22 or other fastening means.

The locking member comprises a cylindrical shaft 23 having an eccentric portion 24 of reduced diameter. The shaft is supported on bushings 25 in the carriage pedestal 12. In locking or unlocking the device the shaft is turned axially through an angle of over 90°, and during that movement the eccentric acts as a cam on the locking arm 26, which arm is floatingly supported on the inner ends of the two sections of the shaft.

The arm 26 serves to fasten the locking member detachably to the fixed member or saddle. In locked position, the arm seats in the depression 21 of saddle 20 with the nut or boss 27, carried on the free end of the arm, bearing against the face 28 of the saddle block. The free end of the arm may be threaded to permit of adjusting the nut or boss.

The arm has an enlarged head 29 having a central cylindrical passage 30 extending transversely therethrough concentric with the axis of shaft 23. The passage 30 terminates at each end in a countersunk elongated opening 31 of greater length than width. On reference to Fig. 5 it will be seen that the length of the countersunk end opening 31, that is the horizontal distance between its concave lateral edges 32—33, is greater than the diameter of the passage 30, and that its width, measured vertically, is substantially the same as the diameter of said passage. The radius of curvature of the concave ends 32 is the same, or substantially the same, as the radius of curvature of passage 30 and shaft 23. The inner ends of the two opposed parts or sections of shaft 23 extend into the elongated openings 31, while the eccentric 24 extends through the passage 30 with its periphery tangential to the inner surface of the passage. This floating mount of the locking arm on the shaft permits the free play or limited endwise movement of arm 26 that is required so that the nut 27 may clear the saddle when the arm is swung into or out of locking position.

A pin 34 extends into the head 29 at one side of passage 30 in position to be engaged by the eccentric 24 as will hereinafter be more fully explained. The pin may be held in place by a set-screw 35.

Figure 2:
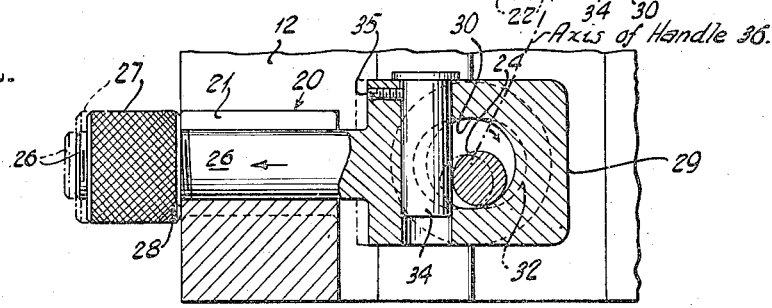
Fig. 2 is a vertical section, on a larger scale, of the locking device in partly released position.
Figure 3:
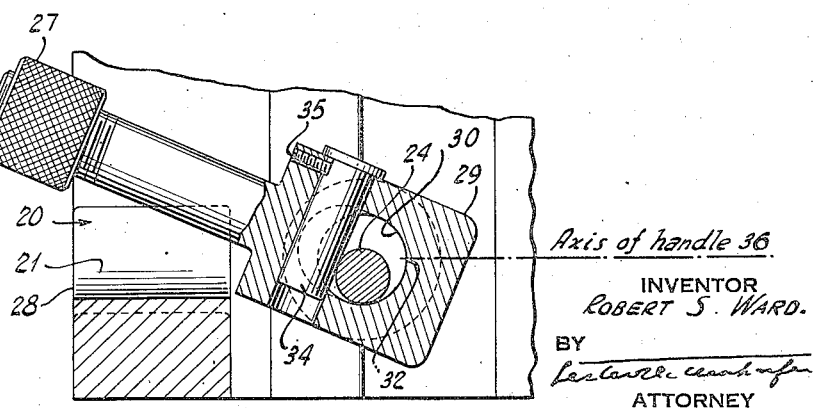
Fig. 3 is a similar view showing the locking device fully released.

The shaft 23, with the eccentric 24, are turned by means of a lever 36 having a handle 37. In Figs. 1, 2 and 3 the axis of the handle lever, in several positions, is indicated by the dot and dash lines. The handle may be provided, as shown in Fig. 4a, with a spring-pressed detent or stop 38, that engages in a recess 39 in the pedestal 12 to hold the handle in its normal horizontal unlocked position.

The manner of operation is as follows: When the members are in locked position the handle lever 36 will extend obliquely upward in the position indicated by the dotted lines in Fig. 1. The eccentric 24 is then on dead center with the arm 26, that is, the center of the eccentric will be in alinement with the longitudinal axis of the arm, and the boss or nut 27 carried on the front end of the arm will be drawn tightly against the front face 28 of the fixed saddle block 20. In unlocking the device the handle lever is swung downwardly to its horizontal position indicated in Fig. 3. During this movement the shaft 23 is turned clockwise, bringing the eccentric into contact with the pin 34, as seen in Fig. 2. The eccentric then drives against the pin, first to slide the arm 26 endwise forwardly on the saddle block so as to space the boss 27 outwardly from the front end of the block, as indicated by the dotted lines in Fig. 2, and then to tilt the arm upwardly clear of the block, as shown in Fig. 3. The floating mount of the arm 26 on shaft 23 permits of such endwise and tilting movements of the arm. When the arm is in locked position, the concave edges 32—33 of the elongated opening 31 will be in neutral position with respect to the shaft, that is to say they will be spaced equally on either side as best seen in Fig. 5. This spacing permits of restricted endwise movement of the arm to the extent of the spacing. As the eccentric drives the arm forward the spacing is gradually reduced until the edge 32 contacts or butts against the shaft. Thereafter the shaft serves as a pivot or fulcrum for the tilting movement of the arm. On the reverse movement of the handle lever the eccentric acts first to permit the arm 26 to drop by gravity into the depression in the saddle block, then to draw the arm backward, and finally to secure it again in locked position.

Various modifications in the details of construction herein shown and described may be made within the scope of the invention defined in the claims.

I claim:

1. In a locking device of the character described, a locking arm having a transverse bore through one end, the ends of the bore being laterally enlarged, a cylindrical shaft having portions that extend into the enlarged ends of the bore on which portions the arm is pivotally supported for restricted endwise and tilting movements, relatively to said shaft, said shaft having an eccentric portion of reduced diameter disposed within the bore tangential thereto for actuating the movements of the arm, and a pin fixed to the arm to pass perpendicularly through the bore in position to be engaged by the eccentric as the latter is moved through an arc by angular rotation of the shaft.

2. In a locking device of the character described, a locking arm having a transverse bore through one end, the ends of the bore being laterally enlarged, a cylindrical shaft having portions that extend into the enlarged ends of the bore on which portions the arm is pivotally supported for restricted endwise and tilting movements relatively to said shaft, said shaft having an eccentric portion of reduced diameter disposed within the bore tangential thereto for actuating the movements of the arm, and a pin fixed to the arm to pass through the bore in position to be engaged by the eccentric as the latter is moved through an arc on angular rotary movement of the shaft.

ROBERT S. WARD.

REFERENCES CITED

The following references are of record in the file of this patent:

UNITED STATES PATENTS

| Number | Name | Date |
|---|---|---|
| 1,795,917 | Willshaw | Mar. 10, 1931 |
| 2,372,833 | Jobst | Apr. 3, 1945 |